United States Patent
Kirschner et al.

(10) Patent No.: US 8,308,819 B2
(45) Date of Patent: Nov. 13, 2012

(54) METHOD FOR DETECTING THE REMOVAL OF A PROCESSING UNIT FROM A PRINTED CIRCUIT BOARD

(75) Inventors: Wesley A. Kirschner, Farmington, CT (US); Robert W. Sisson, Trumbull, CT (US); John A. Hurd, Torrington, CT (US); Frederick W. Ryan, Jr., Oxford, CT (US); Gary S. Jacobson, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 977 days.

(21) Appl. No.: 11/641,180

(22) Filed: Dec. 19, 2006

(65) Prior Publication Data

US 2008/0148415 A1 Jun. 19, 2008

(51) Int. Cl.
*G08B 13/00* (2006.01)
(52) U.S. Cl. .......................... 726/35; 726/34
(58) Field of Classification Search ............ 726/34–35
See application file for complete search history.

(56) References Cited

U.S. PATENT DOCUMENTS

| | | | |
|---|---|---|---|
| 6,023,690 A * | 2/2000 | Chrosny et al. | 705/405 |
| 6,362,724 B1 * | 3/2002 | Rosenau | 340/5.2 |
| 6,567,708 B1 * | 5/2003 | Bechtel et al. | 700/19 |
| 6,625,741 B1 * | 9/2003 | Post et al. | 713/340 |
| 2002/0194017 A1 * | 12/2002 | Post et al. | 705/1 |
| 2006/0271500 A1 | 11/2006 | Obrea et al. | |

OTHER PUBLICATIONS

Kacha et al., A Wavelet-Based Approach for Frequency Estimation of Interference Signals in Printed Circuit Boards, Sep. 2003, Trinity College Dublin, ISICT '03.*

* cited by examiner

*Primary Examiner* — Brandon Hoffman
*Assistant Examiner* — Samuel Ambaye
(74) *Attorney, Agent, or Firm* — Brian A. Collins; Charles R. Malandra, Jr.; Steven J. Shapiro

(57) ABSTRACT

Various methods for detecting the removal of a processing unit, such as a microprocessor or a microcontroller, form a printed circuit board in a secure printing system, such as a postage metering system are provided. The methods utilize one or more of a real time clock provided internal to the processing unit, a CMOS device provided on the printed circuit board external to the processing unit, and CMOS memory internal to the processing unit to detect the removal of the processing unit and therefore an attack.

14 Claims, 3 Drawing Sheets

METHOD FOR DETECTING THE REMOVAL OF A PROCESSING UNIT FROM A PRINTED CIRCUIT BOARD

FIELD OF THE INVENTION

The present invention relates to secure printing systems, and in particular to a method of detecting the removal of a processing unit, such as a microprocessor or a microcontroller, from a printed circuit board in a secure printing system.

BACKGROUND OF THE INVENTION

A number of secure printing systems, which may be used for printing items of value in a secure manner, are known in the art. One example of a secure printing system is a postage metering system. A postage metering system applies evidence of postage, commonly referred to as postal indicium, to an envelope or other mailpiece (directly or on a label to be applied thereto) and accounts for the value of the postage dispensed. Secure printing systems, such as postage metering systems, typically include a processing unit, such as, without limitation, a microprocessor or a microcontroller, that includes internal memory for storing (i) programs to be executed by the processing unit (referred to herein as "internal program memory"), and (ii) state information relating to the items that are to be printed (referred to herein as "internal storage memory"). The stored state information may include, for example and without limitation, information, such as a sequence number, identifying each item that may be printed, and information which indicates whether or not each item that may be printed has in fact been printed. One particular postage metering system includes a secure postage printing device that stores and prints indicia for specific postage denominations that were previously dispensed by an approved postal security device (PSD) associated with a data center. In operation, a user sends a request to purchase postage to the data center in the form of a request for a particular number of indicia for one or more particular postage denominations (e.g., twenty $0.37 indicia and twenty $0.74 indicia). In response, the data center generates an appropriate number of postage data records or tokens (one for each requested indicium) and transmits them to the postage printing device where they are stored until printed, refunded or erased at a refurbishment facility. In such as system, the internal storage memory in the processing unit thereof stores state information for each postage data record or token including a sequence number for the token (typically generated and assigned sequentially when the tokens are created at the data center) and a state of the token, including (i) available for printing, (ii) already printed, (iii) refund pending, and (iv) refunded.

Because secure printing systems are often used for printing items of value, they may often be the subject of attack by attackers who desire to print or reprint items of value without paying for such items. For example, an attacker may try various techniques to use a postage metering system to print or reprint postal indicia, such as those represented by the tokens described above, without paying for the indicia. One such possible attack on a secure printing system includes the following steps: (1) de-solder the processing unit and remove it from the printed circuit board on which it is provided, (2) copy the state information in the internal storage memory (for example, using a PROM programmer) and save it as an image, (3) put the processing unit back onto the printed circuit board, re-solder the connections, and print items of value, such as postage, (4) again de-solder the processing unit and remove it form the printed circuit board, (5) copy the saved image of the internal storage memory back into the processing unit (for example, using a PROM programmer), which will result in the prior states being reloaded, and (6) put the processing unit back onto the printed circuit board and re-solder the connections for normal operation.

One prior art method of detecting and/or preventing such an attack employs a security bit in the processing unit. In particular, when the security bit is flipped (e.g., set to a 1), the internal memory of the processing unit cannot be read by a device such as a PROM programmer. However, frequently such a security bit also prevents execution of code from an external memory device, which make a secure printing system employing the security bit impractical for many secure applications since the code and memory space is therefore limited. Another prior art method of detecting and/or preventing such an attack involves the use of tamper detection circuitry. Such circuitry, however, is costly and therefore may not be a viable option at the lower cost end of the secure printing system market. Thus, there is a need for alternative methods for detecting the removal of a processing unit, such as a microprocessor or a microcontroller, from a printed circuit board in a secure printing system.

SUMMARY OF THE INVENTION

In one embodiment, a method is provided for detecting that a processing unit having a real time clock internal thereto has been removed from a printed circuit board. The method included providing the processing unit on the printed circuit board, providing a power source on the printed circuit board separate from the processing unit, electrically connecting the power source to the real time clock to provide power to the real time clock, monitoring the functioning of the real time clock, and determining that the processing unit has been removed from the printed circuit board if one or more of the following is determined: (i) that the real time clock has stopped keeping time, (ii) that the real time clock is not enabled, or (iii) the real time clock is reporting a time that is prior to a predetermined stored time.

In another embodiment, a method is provided for detecting that a processing unit has been removed from a printed circuit board, wherein the printed circuit board is included within a secure printing system and wherein the processing unit stores state information relating to one or more items printed by or to be printed by the secure printing system. The processing unit has a real time clock internal thereto, and the real time clock has one or more registers. The method includes providing the processing unit on the printed circuit board, providing a power source on the printed circuit board separate from the processing unit, electrically connecting the power source to the real time clock to provide power to the real time clock, storing a representation, such as a hash, of the state information in the one or more registers, wherein the one or more registers are able to store the representation only if the power is provided to the real time clock, monitoring the one or more registers, and determining that the processing unit has been removed from the printed circuit board if it determined that the one or more registers no longer store the representation of the state information.

In still another embodiment, a method is provided for detecting that a processing unit has been removed from a printed circuit board, wherein the printed circuit board is included within a secure printing system for printing a plurality of items, wherein each of the items has a sequence number associated therewith, and wherein the items are printed in order according to the sequence numbers. The method includes providing the processing unit on the printed circuit board, providing a memory device on the printed circuit board, wherein the memory device is adapted to store a most recent sequence number, providing a power source on the printed circuit board separate from the processing unit, and electrically connecting the power source to the memory device to provide power to the memory device, wherein the memory device will store the most recent sequence number even if the processing unit is removed from the printed circuit board. The method further includes, when each of the items is printed, storing the sequence number associated with the item in the memory device as the most recent sequence number, receiving a request to print a selected one of the items, and printing the selected one of the items only if it is determined that the sequence number associated with the selected one of the items is greater than the most recent sequence number currently stored by the memory device.

In still a further embodiment, a method is provided for protecting a processing unit included within a secure printing system from an attack wherein the processing unit is removed from an associated printed circuit board. The method includes providing the processing unit on the printed circuit board, wherein the processing unit has an internal memory, providing a power source on the printed circuit board separate from the processing unit, electrically connecting the power source to the internal memory to provide power to the internal memory, and storing in the internal memory state information relating to one or more items printed by or to be printed by the secure printing system, wherein the internal memory is able to store the state information only if the power is provided to the internal memory. If the processing unit is removed from the printed circuit board, the power source will no longer be electrically connected to the internal memory and the state information will no longer be stored in the internal memory.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
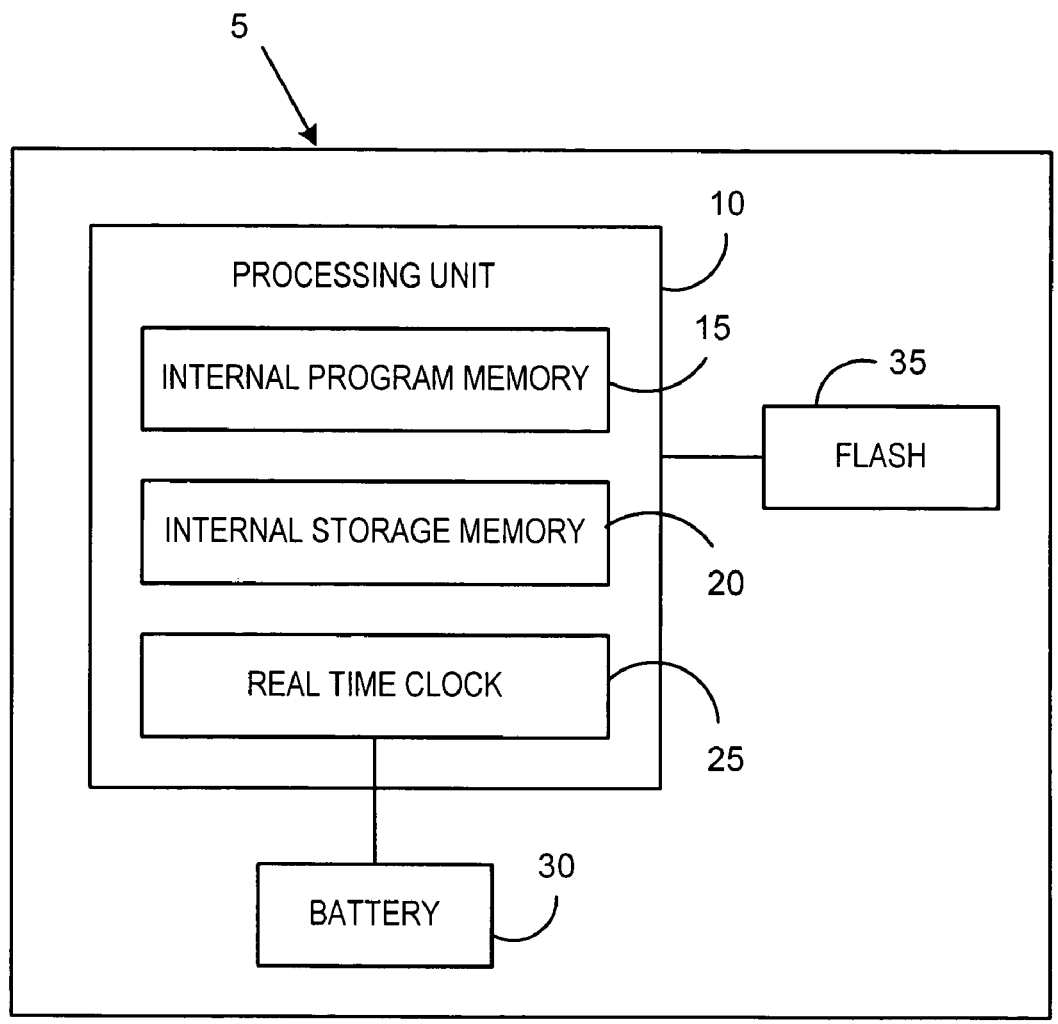
FIG. 1 is a schematic illustration of one embodiment of a printed circuit board included within a secure printing system that is configured to implement a method for detecting the removal of a processing unit from the printed circuit board according to the present invention.

FIG. 1 is a schematic illustration of one embodiment of a printed circuit board 5 included within a secure printing system such as, without limitation, a postage metering system. The printed circuit board 5 is configured to implement a method for detecting the removal of a processing unit from a printed circuit board according to one embodiment of the present invention. The printed circuit board 5 includes a processing unit 10, which may be, for example, a microprocessor or a microcontroller, provided on a suitable supporting substrate. The processing unit 10 includes, among other items, internal program memory 15 for storing programs executable by the processing unit 10 for controlling the operation of the secure printing system, and internal storage memory 20 for storing state information, as described elsewhere herein, relating to the items that are to be printed by the secure printing system. The processing unit 10 also includes an internal real time clock 25 that is structured to be separately powered (i.e., separate from the remainder of the processing unit 10) by, for example, a separate power source. For this purpose, a battery 30 or similar power source is provided on the printed circuit board 5 and is electrically connected to the real time clock 25 for providing operational power thereto. It should be understood that various power management techniques may be employed to extend the life of the battery 30 (e.g., powering the real time clock 25 using the same power source as the processing unit 10 when the processing unit 10 is powered on and powering the real time clock 25 with the battery 30 otherwise). In addition, in the particular embodiment shown, a flash memory device 35 is provided on the printed circuit board 5 and is in electronic communication with the processing unit 10. The flash memory device 35 includes code executable by the processing unit 10 for implementing the method described below. In an alternate embodiment, the flash memory device 35 may be omitted, and the code executable by the processing unit 10 for implementing the method described below may instead be stored in the internal program memory 15.

When the printed circuit board 5 is manufactured, the real time clock 25 is connected to the battery 30 and the real time clock is initialized to the then current time, and thereafter, as long as it is powered, it keeps time as it is designed to do. In operation, and according to an aspect of this embodiment of the invention, each time the processing unit 10 is powered up, it is adapted to check whether the real time clock 25 is functioning properly (i.e.,., telling time) using the code stored in either the flash memory device 35 or in the internal program memory 15. If it is determined that the real time clock 25 is functioning properly, then operation of the printed circuit board 5 and thus the secure printing system in which it is included is allowed to proceed normally. If, however, it is determined that the real time clock 25 is not functioning properly (e.g., it is not telling time and has perhaps retuned to some initialization value), a possible tamper event is detected and reported and the operation of the printed circuit board 5 and thus the secure printing system in which it is included is not allowed to proceed until the potential tamper condition is addressed.

One method of determining if the real time clock 25 is functioning properly consists of reading the time of/reported by the real-time clock 25 and determining if the time is within a certain date range. For example, many real-time clock devices power-up to a default date (e.g,., Jan. 1, 1970) which is prior to the date of manufacture of the circuit board on which it is provided (such as printed circuit board 5). If the processing unit 10 is removed from the printed circuit board 5, the real time clock 25 will be disconnected from its power source, battery 30, and, upon the next application of power, return to the default date. A date later than the default date (e.g., Jan. 1, 2000) may be stored in internal program memory 15, internal storage memory 20 or flash memory 35. The program stored in either internal program memory 15 or flash memory 35 may be configured to periodically check the date reported by the real time clock 25 and check if it is prior to the date stored in either internal program memory 15, internal storage memory 20 or flash memory 35 as described above. If the date reported by the real time clock 25 is prior to this date, the real time clock 25 is not functioning properly. Alternatively, real time clock may default to a disabled state or off state. In manufacturing, the real time clock 25 may be enabled (e.g., by writing a specific value to a register). A program stored in internal program memory 15 of flash memory 35 may be configured to detect if the real time clock 25 is keeping time or simply read the value of the enable register.

Thus, if an attacker attempts an attack on the secure printing system that involves the removal of the processing unit 10 from the printed circuit board 5, the connection between the battery 30 and the real time clock 25 will be broken, and, as a result, the real time clock 25 will stop functioning due to a lack of power. Therefore, when the attacker returns the processing unit 10 to the printed circuit board 5 and the processing unit 10 is powered up, it will check the real time clock 25 as described above and determine that it is not functioning properly (in any of the manners described above). As a result, the processing unit 10 will detect and report a possible tamper attempt and the attack will be thwarted.

In addition, as is known, many real time clocks provided with microprocessors or the like include registers that are typically used to set clock alarms, such as a time where the clock should inform the software that an event has occurred. However, these registers can be used to store different information. Thus, according to a further embodiment of the invention, the real time clock 25 includes the registers just described, and a hash of the state information being stored in the internal storage memory 20 is created and stored in the registers of the real time clock 25 (and updated as needed, e.g., periodically or upon a change of information). If an attacker removes the processing unit 10 from the printed circuit board 5, that will result in the connection between the battery 30 and the real time clock 25 being broken, and, as a result, the registers in the real time clock 25 storing the hash will be erased (due to the power loss). According to an aspect to the invention, the processing unit 10 is adapted, based on code stored in either the flash memory device 35 or in the internal program memory 15, to check the registers of the real time clock 25 on power up to determine whether the hash is present. If it is not, then a tamper event is detected and reported as described above in order to thwart an attack.

Figure 2:
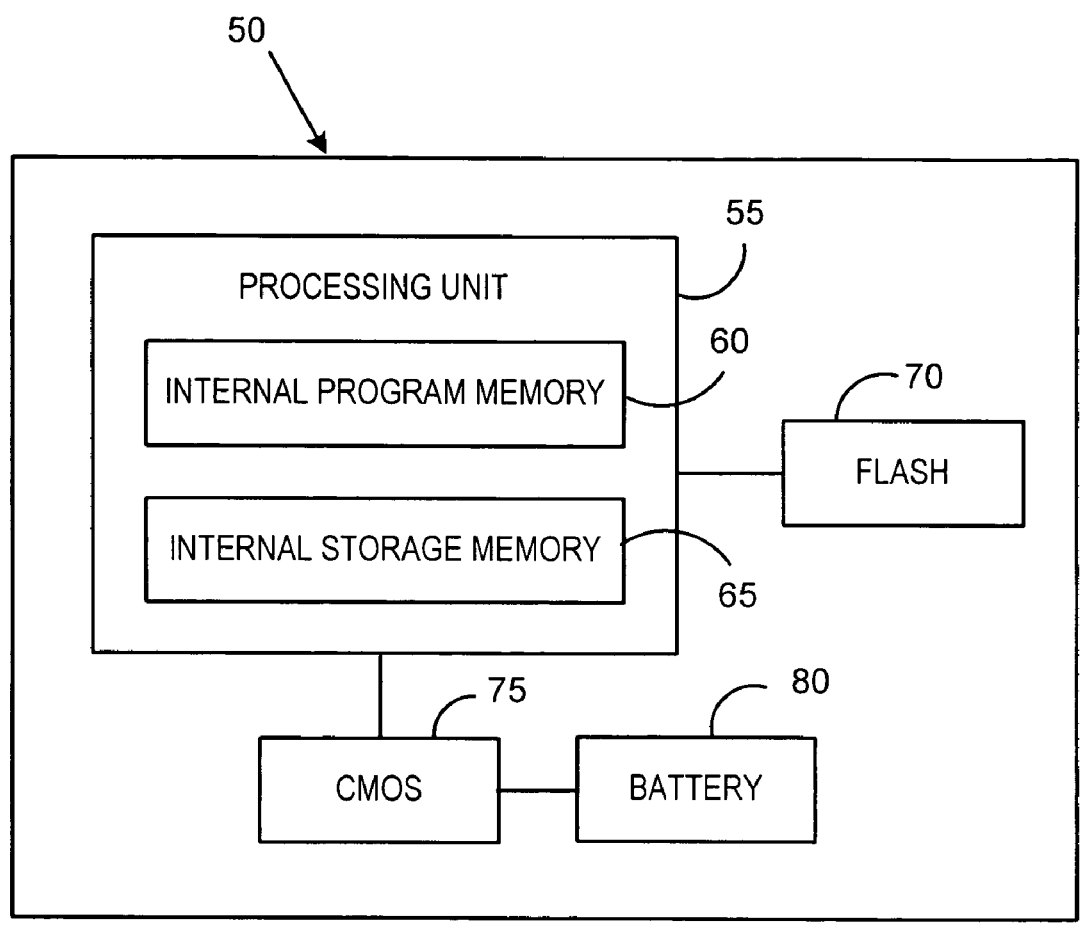
FIG. 2 is a schematic illustration of another embodiment of a printed circuit board included within a secure printing system that is configured to implement a method for detecting the removal of a processing unit from the printed circuit board according to the present invention.

FIG. 2 is a schematic illustration of another embodiment of a printed circuit board 50 included within a secure printing system such as, without limitation, a postage metering system. The secure printing system in this embodiment is one in which a sequence number is pre-assigned to each item, such as a token representing a postal indicium, that is to be printed by the secure printing system. The printed circuit board 50 is configured to implement a method for detecting the removal of a processing unit from a printed circuit board according to another embodiment of the present invention in order to prevent replay attacks wherein an attacker changes state information for one or more items from an "already printed" state to an "available to print" state so that already printed items can be reprinted. The printed circuit board 50 includes a processing unit 55, which may be, for example, a microprocessor or a microcontroller, provided on a suitable supporting substrate. The processing unit 55 includes, among other items, internal program memory 60 for storing programs executable by the processing unit 55 for controlling the operation of the secure printing system, and internal storage memory 65 for storing state information, as described elsewhere herein (including the sequence numbers for items), relating to the items that are to be printed by the secure printing system. The printed circuit board 50 also includes a Complementary Metal Oxide Semiconductor (CMOS) memory device 75 (or alternatively some other memory type that loses its contents when the power is removed) that is powered by a battery 80 or similar power source also provided on the printed circuit board 50. The CMOS memory device 75 is in electronic communication with the processing unit 55 for the reason described below. It should be understood that various power management techniques may be employed to extend the life of the battery 80 (e.g., powering the CMOS memory device 75using the same power source as the processing unit 55 when the processing unit 55 is powered on and powering the CMOS memory device 75 with the battery 80 otherwise). In addition, in the particular embodiment shown, a flash memory device 70 is provided on the printed circuit board 50 and is in electronic communication with the processing unit 55. The flash memory device 70 includes code executable by the processing unit 55 for implementing the method described below. In an alternate embodiment, the flash memory device 70 may be omitted, and the code executable by the processing unit 55 for implementing the method described below may instead be stored in the internal program memory 60.

In operation, each time the secure printing system which includes the printed circuit board 55 prints an item, the sequence number of that item is stored in the CMOS memory device 75, and preferably replaces the existing sequence number stored therein (from prior prints). Thus, the CMOS memory device 75 will always store the sequence number of the most recently printed item, and because items are printed in order according to sequence number, it will be higher than any previously printed and stored sequence numbers. According to an aspect of the invention, the processing unit is adapted to check, each time that an item is being printed, that the sequence number of the item being printed is greater than the sequence number currently stored in the CMOS memory device 75. If the sequence number is higher, then printing may continue. However, if the sequence number is lower, then the processing unit 55 does not allow printing to continue, but instead reports a possible tamper event which indicates a likely replay attack (trying to re-print an item already printed). Thus, if an attacker attempts a replay attack that involves (i) removing the processing unit 55 from the printed circuit board 50 (which will not effect the CMOS memory device 75 because it is backed by its own battery 80), (ii) changing state information stored in the internal storage memory 65 for one or more items from an already printed state to an available to print state, and (iii) trying to reprint an item, the attack will be thwarted because the item that the attacker is attempting to reprint will have a sequence number that is lower than the sequence number stored in the CMOS memory device 75. As a result, the processing unit 55 will detect and report a tamper event. It should be understood that multiple counters may be maintained in CMOS memory device 75 for a variety of different items (e.g., postage of $0.37 and postage of $3.95).

Figure 3:
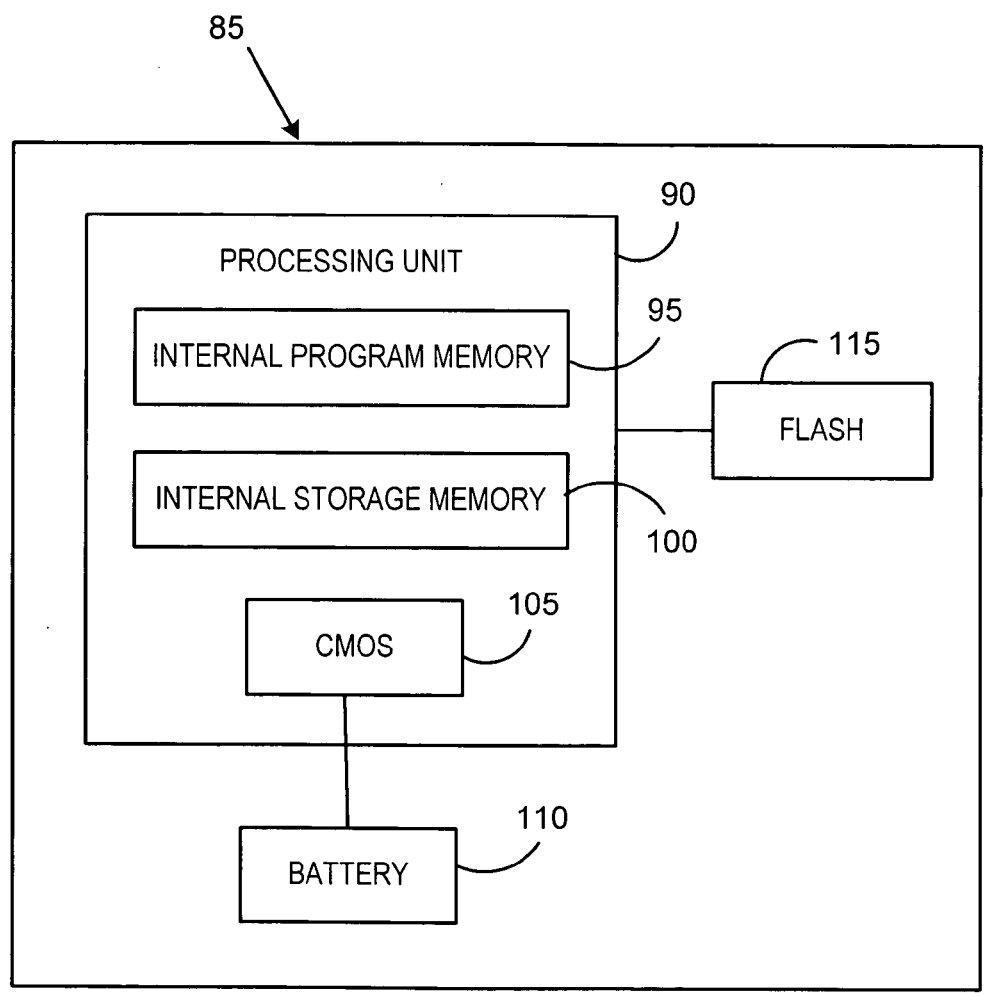
FIG. 3 is a schematic illustration of still another embodiment of a printed circuit board included within a secure printing system that is configured to implement a method for detecting the removal of a processing unit from the printed circuit board according to the present invention.

FIG. 3 is a schematic illustration of yet another embodiment of a printed circuit board 85 included within a secure printing system such as, without limitation, a postage metering system. The printed circuit board 85 is configured to implement a method for detecting the removal of a processing unit from a printed circuit board according to another embodiment of the present invention. The printed circuit board 85 includes a processing unit 90, which may be, for example, a microprocessor or a microcontroller, provided on a suitable supporting substrate. The processing unit 90 includes, among other items, internal program memory 95 for storing programs executable by the processing unit 90 for controlling the operation of the secure printing system, and internal storage memory 100. The processing unit 90 also includes internal CMOS memory 105 that is structured to be separately powered (i.e., separate from the remainder of the processing unit 10) by a separate power source. For this purpose, a battery 110 or similar power source is provided on the printed circuit board 85 and is electrically connected to the internal CMOS memory 105 for providing operational power thereto. It should be understood that various power management techniques may be employed to extend the life of the battery 110 (e.g., powering CMOS memory 105 using the same power source as the processing unit 90 when the processing unit 90 is powered on and powering the CMOS memory 105 with the battery 110 otherwise). In this embodiment, the processing unit 90 is adapted to store the state information, as described elsewhere herein, relating to the items that are to be printed by the secure printing system in the internal CMOS memory 105 rather than in the internal storage memory 100. An internal real time clock (not shown) may also be provided along with the internal CMOS memory 105. In addition, in the particular embodiment shown, a flash memory device 115 is provided on the printed circuit board 85 and is in electronic communication with the processing unit 90. The flash memory device 115 includes code executable by the processing unit 90 for implementing the method described below. In an alternate embodiment, the flash memory device 115 may be omitted, and the code executable by the processing unit 90 for implementing the method described below may instead be stored in the internal program memory 95.

In the embodiment shown in FIG. 3, if an attacker removes the processing unit 90 from the printed circuit board 85, the connection between the internal CMOS memory 105 and the battery 110 will be broken. As a result, the state information contained in the internal CMOS memory 105 will disappear. Thus, the attacker will be unable to copy the state information using, for example, a PROM programmer and therefore the attack will be thwarted. In another embodiment, the internal CMOS memory 105 also includes a key that is required in order for any printing to occur. In particular, the print head of the secure printing system checks for the key when a print request is received, and will only print items if the correct key from the internal CMOS memory 105 has been provided. Thus, if an attacker removes the processing unit 90 from the printed circuit board 85, the key will also disappear, making future printing by the attacker impossible. This key protection embodiment provides extra protection against an attacker that may try to reprogram the state information that was lost when the processing unit 90 was removed from the printed circuit board 85 and the battery connection was broken.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for detecting that an attack has occurred as a result of a processing unit being removed from a printed circuit board, comprising:
   providing said processing unit on said printed circuit board, said processing unit having a real time clock internal thereto;
   providing a power source on said printed circuit board separate from said processing unit;
   electrically connecting said power source to said real time clock to provide power to said real time clock;
   monitoring the date reported by said real time clock to determine whether the attack has occurred as a consequence of the processing unit being removed from said printed circuit board,
   determining that the attack has occurred when one of the following is determined: that said real time clock is not enabled, and said real time clock is reporting a date that is prior to a predetermined stored date that is later than a default date of the real time clock.

2. The method according to claim 1, wherein said power source is a battery.

3. The method according to claim 1, wherein said printed circuit board is included within a secure printing system; and further comprising reporting that an attack may have occurred.

4. A method for detecting that an attack has occurred as a result of a processing unit being removed from a printed circuit board wherein said printed circuit board is included within a secure printing system and wherein said processing unit stores state information relating to one or more items printed by or to be printed by said secure printing system,
   said processing unit disposed on said printed circuit board, said processing unit having a real time clock internal thereto, and said real time clock having one or more registers; the method comprising:
   providing a power source on said printed circuit board separate from said processing unit;
   electrically connecting said power source to said real time clock to provide power to said real time clock;
   storing a representation of said state information in said one or more registers, wherein said one or more registers are able to store said representation only if said power is provided to said real time clock;
   monitoring said one or more registers;
   determining that said processing unit has been removed from, and returned to, said printed circuit board if it determined that said one or more registers no longer store said representation of said state information.

5. The method according to claim 4, wherein said power source is a battery.

6. The method according to claim 4, wherein representation of said state information is a hash of said state information; and further comprising reporting that an attack may have occurred.

7. A method of protecting a processing unit included within a secure printing system from an attack wherein said processing unit is removed from an associated printed circuit board, comprising:

providing said processing unit on said printed circuit board, said processing unit having an internal memory;

providing a power source on said printed circuit board separate from said processing unit;

electrically connecting said power source to said internal memory to provide power to said internal memory; and storing in said internal memory state information relating to one or more items printed by or to be printed by said secure printing system, wherein said internal memory is able to store said state information only if said power is provided to said internal memory;

wherein if said processing unit is removed from said printed circuit board, said power source will no longer be electrically connected to said internal memory and said state information will no longer be stored in said internal memory, thereby indicating the attack.

8. The method according to claim 7, wherein said power source is a battery.

9. The method according to claim 7, wherein said internal memory is CMOS memory.

10. The method according to claim 7, wherein said internal memory is provided with a key, wherein said internal memory is able to store said key only if said power is provided to said internal memory, wherein if said processing unit is removed from said printed circuit board, said power source will no longer be electrically connected to said internal memory and said key will no longer be stored in said internal memory, the method further comprising allowing said secure printing system to print one or more items only if said key is stored in said internal memory.

11. A method for detecting that an attack has occurred as a result of a processing unit being removed from a printed circuit board, comprising:

providing said processing unit having an internal real time clock on said printed circuit board;

providing a power source on said printed circuit board separate from said processing unit;

electrically connecting said power source to said real time clock to provide power to said real time clock;

monitoring the functioning of said real time clock to determine whether an attack has occurred as a consequence of the processing unit being removed from, and subsequently returned to, said printed circuit board, and determining that an attack has occurred when said real time clock reports a date that is prior to a predetermined stored date that is later than a default date of the real time clock.

12. The method according to claim 11, further including the step of reporting that an attack may have occurred.

13. The method according to claim 12, wherein said power source is a battery.

14. The method according to claim 12, wherein said printed circuit board is included within a secure printing system.

* * * * *